US012204271B2

(12) United States Patent
Makino

(10) Patent No.: US 12,204,271 B2
(45) Date of Patent: Jan. 21, 2025

(54) CARTRIDGE AND IMAGE FORMING APPARATUS INCLUDING A RECESSED BACKGROUND WITH TRADEMARK CHARACTER OR LOGO THAT IS RECESSED OR RAISED FROM THE RECESSED BACKGROUND

(71) Applicant: CANON KABUSHIKI KAISHA, Tokyo (JP)

(72) Inventor: Yusaku Makino, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/167,233

(22) Filed: Feb. 10, 2023

(65) Prior Publication Data

US 2023/0297021 A1 Sep. 21, 2023

(30) Foreign Application Priority Data

Mar. 16, 2022 (JP) ................................ 2022-041199

(51) Int. Cl.
*G03G 21/16* (2006.01)
*G03G 21/18* (2006.01)

(52) U.S. Cl.
CPC ..... *G03G 21/1647* (2013.01); *G03G 21/1676* (2013.01); *G03G 21/1821* (2013.01); *G03G 2221/1869* (2013.01)

(58) Field of Classification Search
USPC .......................................................... 399/111
See application file for complete search history.

(56) References Cited

U.S. PATENT DOCUMENTS

2008/0166139 A1* 7/2008 Watanabe .............. G03G 21/16 399/12

FOREIGN PATENT DOCUMENTS

JP 2012128063 A 7/2012

* cited by examiner

*Primary Examiner* — Quana Grainger
(74) *Attorney, Agent, or Firm* — ROSSI, KIMMS & McDOWELL LLP

(57) ABSTRACT

There is provided a cartridge mountable on an image forming apparatus. The cartridge includes a recess portion provided on an exterior surface of the cartridge. The recess portion includes a character portion indicating a character trademark and a background portion serving as a background of the character portion. The character portion has a recess shape recessed from the background portion.

17 Claims, 9 Drawing Sheets

CARTRIDGE AND IMAGE FORMING APPARATUS INCLUDING A RECESSED BACKGROUND WITH TRADEMARK CHARACTER OR LOGO THAT IS RECESSED OR RAISED FROM THE RECESSED BACKGROUND

BACKGROUND OF THE INVENTION

Field of the Invention

The present invention relates to a cartridge to be mounted on an image forming apparatus and an image forming apparatus on which the cartridge is mounted.

Description of the Related Art

In the related art, an image forming apparatus adopting an electrophotographic system has been widely applied as a copying machine, a printer, a plotter, a facsimile, or a multifunction machine having multiple functions thereof. In the related art, the image forming apparatus is configured such that a user or a service person can replace a component consumed after the image forming apparatus such as a developing container or a drum unit is used.

In some cases, a replacement caution, a standard indicating mark, or a manufacturer logo may be written on a replacement unit such as the developing container or the drum unit. In the related art, a method of attaching a label is known as a method of writing the replacement caution, the standard indicating mark, or the manufacturer logo. However, the method of attaching the label has a problem as follows. It is necessary to peel off the label when the replacement unit is recycled, and disassembly is troublesome when the replacement unit is recycled.

Meanwhile, Japanese Patent Application Laid-Open No. 2012-128063 discloses an image forming apparatus that writes a mark or a logo by performing laser processing on a resin-made replacement unit. The image forming apparatus of Japanese Patent Application Laid-Open No. 2012-128063 can be easily disassembled since the label does not need to be peeled off when the replacement unit is recycled.

However, according to Japanese Patent Application Laid-Open No. 2012-128063, a dedicated facility for performing the laser processing is required, and man-hours for the laser processing are also required. For example, the above-described replacement unit needs to be manufactured in a larger amount than an apparatus body of the image forming apparatus. Therefore, there is a problem of increasing costs resulting from the facility or the man-hours for the laser processing.

Therefore, in the related art, when a resin component of a cartridge which is the replacement unit is molded, an uneven shape corresponding to the replacement caution or the standard indicating mark, or the manufacturer logo may be formed on the resin component, by using an uneven shape provided in a mold when the resin component is molded.

Meanwhile, the image forming apparatus or the replacement unit may be sold as so-called original equipment manufacturing (OEM) supplied as a product having different information such as the manufacturer logo or a standard to be acquired. In this case, when the replacement unit is manufactured, it may be necessary to hide the manufacturer logo or the standard indicating mark at the time of manufacturing.

However, in the related art, when information such as the manufacturer logo or the standard indicating mark at the time of manufacturing is formed by using the uneven shape formed when the resin component of the replacement unit is molded, it is difficult to switch between displaying and hiding the logo or the mark.

SUMMARY OF THE INVENTION

It is desirable to provide a cartridge and an image forming apparatus which can switch between displaying and hiding information such as a logo or a standard provided in the cartridge with a simple configuration.

According to an aspect of the present invention, there is provided a cartridge mountable on an image forming apparatus. The cartridge includes a recess portion provided on an exterior surface of the cartridge. The recess portion includes a character portion indicating a character trademark and a background portion serving as a background of the character portion. The character portion has a recess shape recessed from the background portion.

Further features of the present invention will become apparent from the following description of exemplary embodiments with reference to the attached drawings.

DESCRIPTION OF THE EMBODIMENTS

Figure 1:
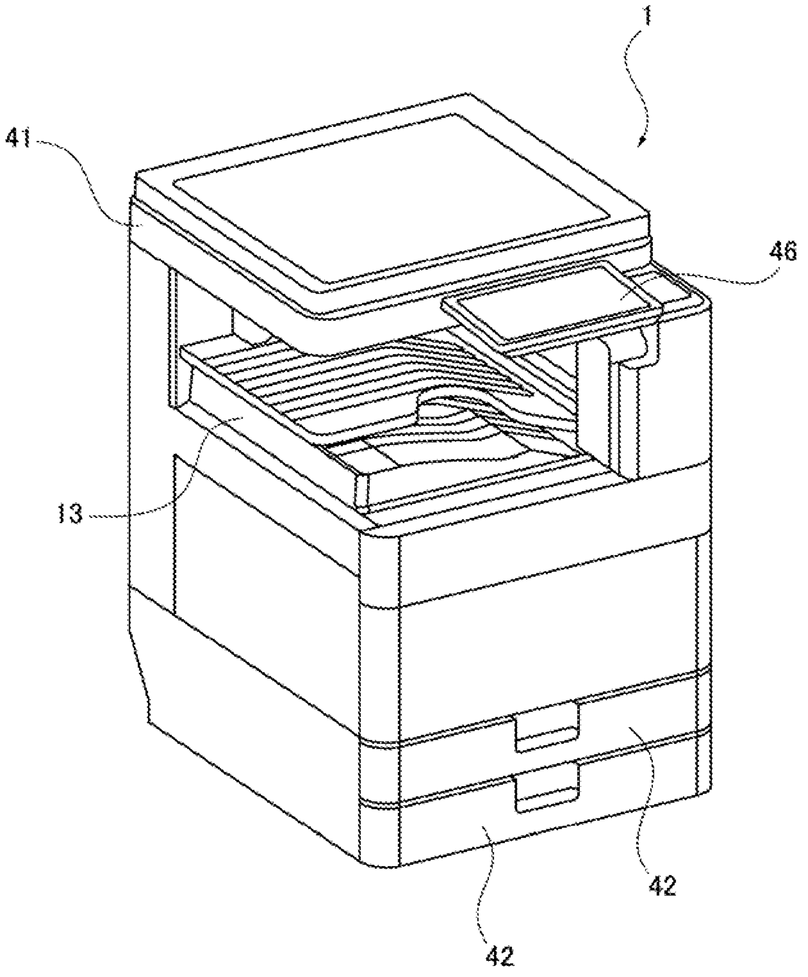
FIG. 1 is a perspective view of an image forming apparatus according to a first embodiment of the present invention.

Hereinafter, embodiments will be described in detail with reference to the drawings.

First Embodiment

<Configuration of Image Forming Apparatus>

A configuration of an image forming apparatus 1 according to a first embodiment of the present invention will be described in detail with reference to FIGS. 1 and 2.

The image forming apparatus 1 includes a secondary transfer roller 8, a registration roller 9, a sheet feeding roller 10, a toner bottle 12, a discharge tray 13, a reverse conveying roller 17, and a discharge conveying portion 18. In addition, the image forming apparatus 1 includes an original reading portion 41, a sheet feeding portion 42, an image forming portion 44, a fixing portion 45, and an operation portion 46.

The secondary transfer roller 8 secondarily transfers a toner image transferred to an intermediate transfer belt 7 to a sheet S conveyed from the registration roller 9. The secondary transfer roller 8 conveys the sheet S to which the toner image is secondarily transferred toward the fixing portion 45.

The registration roller 9 conveys the sheet S conveyed from the sheet feeding roller 10 or the reverse conveying roller 17 to the secondary transfer roller 8 in accordance with a timing at which the toner image primarily transferred to the intermediate transfer belt 7 is conveyed to the secondary transfer roller 8.

The sheet feeding roller 10 conveys the sheet S fed one by one from the sheet feeding portion 42 by a pickup roller (not illustrated) toward the registration roller 9.

The toner bottle 12 stores a toner. The toner bottle 12 supplies the stored toner to a development device (not illustrated) of the image forming portion 44.

The sheet S discharged from the discharge conveying portion 18 is stacked on the discharge tray 13.

The reverse conveying roller 17 conveys the sheet S conveyed from the discharge conveying portion 18 toward the registration roller 9.

The discharge conveying portion 18 is provided downstream of the fixing portion 45 in a conveying direction of the sheet S. The discharge conveying portion 18 discharges the sheet S conveyed from the fixing portion 45 to the discharge tray 13, or conveys the sheet S toward the reverse conveying roller 17.

The original reading portion 41 scans an original to generate an image signal, and outputs the generated image signal to a controller (not illustrated).

The sheet S is stored in the sheet feeding portion 42.

The image forming portion 44 forms an image on the sheet S by using a cartridge 20 (to be described later). Specifically, the image forming portion 44 includes an exposure unit 2, an imaging unit 3 which is a process cartridge, a primary transfer portion 5, and the intermediate transfer belt 7.

The exposure unit 2 irradiates and scans a photosensitive drum 6 with a laser beam to expose the photosensitive drum 6.

The imaging unit 3 includes four photosensitive drums 6, and a charger, a development device, and a cleaner (not illustrated) which are disposed around the photosensitive drums 6.

The primary transfer portion 5 is disposed to face the photosensitive drums 6 via the intermediate transfer belt 7. A primary transfer bias is applied to the primary transfer portion 5 from an electric substrate (not illustrated).

The intermediate transfer belt 7 is disposed to be in contact with each photosensitive drum 6.

The fixing portion 45 applies heat and pressure to the sheet S conveyed from the secondary transfer roller 8 to fix the toner image, thereby forming a print image in which the toner is melted, mixed, and fixed on the sheet S. The fixing portion 45 conveys the sheet S on which the print image is formed toward the discharge conveying portion 18.

For example, the operation portion 46 is a touch panel which enables a touch operation, and outputs an electric signal corresponding to an operation to a controller (not illustrated).

The controller (not illustrated) controls each unit to form an image on the sheet S, based on an electric signal input from the operation portion 46 and an image signal input from the original reading portion 41.

A cartridge 20 (not illustrated in FIGS. 1 and 2) detachably mounted on the image forming apparatus 1 is mounted on the image forming apparatus 1 having the above-described configuration.

<Configuration of Cartridge>

A configuration of the cartridge 20 according to the first embodiment of the present invention will be described in detail with reference to FIGS. 3 to 5.

The cartridge 20 is a replacement unit mounted on the image forming portion 44 of the image forming apparatus 1 such as a developing cartridge or a drum cartridge. Here, the developing cartridge is a cartridge having a developing unit that develops an electrostatic latent image formed on the photosensitive drum 6 by using the toner. The drum cartridge is a cartridge having the photosensitive drum 6. The cartridge 20 is not limited to the cartridge mounted on the image forming portion 44 such as the developing cartridge or the drum cartridge, and may be any cartridge mountable on the image forming apparatus 1.

The cartridge 20 includes a housing 20*a* and a recess portion 21.

The housing 20*a* includes a mechanism (not illustrated) for detachably mounting the cartridge 20 on the image forming apparatus 1.

The recess portion 21 is provided on an exterior surface 20*b* visible from an outside of the housing 20*a*, and has a recess shape recessed from the exterior surface 20*b* of the housing 20*a*. Specifically, the recess portion 21 includes an information display portion 22 and background portion 23.

The information display portion 22 has a recess shape recessed from the background portion 23. A depth L2 of the information display portion 22 is equal to or smaller than 1/10 of a length L1 of the information display portion 22 in a longitudinal direction.

The information display portion 22 displays information on the cartridge 20. The information on the cartridge 20 is a manufacturer name of the cartridge 20, a replacement caution or a standard indicating mark. Here, the manufacturer name of the cartridge 20 will be described as an example.

The information display portion 22 is a character portion indicating a character trademark or an object portion indicating a logo trademark. Here, the character portion will be described as an example. Here, the character trademark is a trademark including only a character, and includes a standard character trademark of a predetermined fixed character font and a special character trademark of a special character font. In addition, the logo trademark is a trademark including only a character but having an excellently designed character, a trademark including excellently designed figure and character, or a trademark including only an excellently designed figure.

The background portion 23 serves as a background of the information display portion 22. A maximum value of a depth L4 of the background portion 23 is equal to a depth L2 of the information display portion 22. That is, the depth L4 of the background portion 23 from the exterior surface 20*b* is equal to or smaller than the depth L2 of the information display portion 22. Here, the depth L4 is a distance from exterior surface 20*b* to background portion 23. The background portion 23 is a flat plain surface. Without being limited to the plain surface, the background portion 23 may have a pattern drawn thereon.

A minimum value of a distance L5 between an inner wall portion 21*a* on one end side of the recess portion 21 in the longitudinal direction and one end side of the information display portion 22 in the longitudinal direction is 1/10 of the length L1 of the information display portion 22 in the longitudinal direction. A minimum value of a distance L6 between an inner wall portion 21*b* on the other end side of the recess portion 21 in the longitudinal direction and the other end side of the information display portion 22 in the longitudinal direction is 1/10 of the length L1 of the information display portion 22 in the longitudinal direction. That is, each of the distances L5 and L6 is equal to or larger than 1/10 of the length L1 of the information display portion 22 in the longitudinal direction.

In addition, a maximum value of each of the distances L5 and L6 is ½ of the length L1 of the information display portion 22 in the longitudinal direction. That is, each of the distances L5 and L6 is equal to or smaller than ½ of the length L1 of the information display portion 22 in the longitudinal direction. For example, each of the distances L5 and L6 is set to approximately 1.5 mm.

<Operation of Image Forming Apparatus>

An operation of the image forming apparatus 1 according to the first embodiment of the present invention will be described in detail with reference to FIGS. 1 and 2.

The photosensitive drum 6 is charged by a charger (not illustrated). A latent image is formed on the charged photosensitive drum 6 by being exposed by the exposure unit 2. A toner image is developed by the toner supplied from the toner bottle 12 to a development device (not illustrated) to form the toner image on the photosensitive drum 6 on which a latent image is formed.

The toner image formed on the photosensitive drum 6 reaches the primary transfer portion 5 where the photosensitive drum 6 and the intermediate transfer belt 7 abut on each other in response to rotation of the photosensitive drum 6, and is sequentially transferred to the intermediate transfer belt 7 by the primary transfer portion 5 disposed to face the photosensitive drum 6.

In addition, the sheet S stored in the sheet feeding portion 42 is fed one by one by a pickup roller (not illustrated), and is conveyed to a nip portion including the secondary transfer roller 8 and the intermediate transfer belt 7 after a timing is adjusted in the registration roller 9. The toner image of the intermediate transfer belt 7 is secondarily transferred to the sheet S conveyed to the nip portion.

The sheet S on which the toner image is secondarily transferred is conveyed to the fixing portion 45, and the toner image is fixed by receiving heat and pressure. The sheet S on which the toner image is fixed is conveyed to the discharge conveying portion 18, and is discharged to the discharge tray 13. Alternatively, the sheet S on which the toner image is fixed is conveyed again by the reverse conveying roller 17 to the nip portion including the secondary transfer roller 8 and the intermediate transfer belt 7. Thereafter, the sheet S is conveyed to the fixing portion 45, and is discharged to the discharge tray 13 by the discharge conveying portion 18.

<Method for Manufacturing Cartridge>

A method for manufacturing the cartridge 20 according to the first embodiment of the present invention will be described in detail with reference to FIGS. 3 to 5.

For example, the cartridge 20 is a resin component formed by an injection molding machine (not illustrated) to perform injection molding. In the injection molding, a resin heated to a fluid state is pushed into a mold in which a shape of the cartridge 20 is carved in advance, and the shape carved in the mold is transferred to the poured resin to form the cartridge 20. Therefore, the information display portion 22 is formed by providing projection portions having the same shape in the mold and transferring the projection portions of the mold to the resin during the injection molding.

In the above-described injection molding, the depth L2 of the information display portion 22 is equal to or smaller than 1/10 of the length L1 of the information display portion 22 in the longitudinal direction. The reason is that a configuration is adopted in view of visibility of the information display portion 22.

For example, when the information display portion 22 is provided in the resin component molded by the injection molding, and when the depth L2 is too large, it becomes necessary to provide an angle with respect to a vertical direction on a side surface wall 22*d* of the information display portion 22 in view of toner parting properties of the mold. In this case, normally, an angle is provided on the side surface wall 22*d* such that the facing side surface wall 22*d* is separated upward from the side surface wall 22*d* in FIG. 5. In this manner, as the depth L2 increases, an interval between the facing side surface walls 22*d* varies in a lower end and an upper end, and a difference occurs between an intended character trademark such as a manufacturer logo trademark and a character trademark formed by a shape of the information display portion 22.

Therefore, since the depth L2 of the information display portion 22 is limited, it is possible to eliminate the difference between the intended character trademark such as the manufacturer logo trademark and the character trademark formed by the shape of the information display portion 22.

In addition, in the injection molding, the minimum value of each of the distances L5 and L6 is set to 1/10 of the length L1 of the information display portion 22 in the longitudinal direction. The reason is that a configuration is adopted in view of visibility of the information display portion 22 and mass productivity of the cartridge 20.

For example, when the information display portion 22 is provided in the resin component molded by the injection molding, and when the minimum value of each of the distances L5 and L6 is set to be smaller than 1/10 of the length L1, the information display portion 22 and the inner wall portion 21*a* or the inner wall portion 21*b* are too close to each other. Therefore, in this case, the visibility of the information display portion 22 decreases. In addition, when the minimum value of each of the distances L5 and L6 is set to be smaller than 1/10 of the length L1, an injection-molded portion of the information display portion 22 and an injection-molded portion of the recess portion 21 in the mold are too close to each other. Consequently, strength of the mold decreases, and the mass productivity deteriorates.

Therefore, the minimum value of the distances L5 and L6 is set to 1/10 of the length L1 of the information display portion 22 in the longitudinal direction. In this manner, deterioration in the visibility of the information display portion 22 and the mass productivity of the cartridge 20 can be prevented, and the cartridge 20 can be easily processed.

In addition, in the above-described injection molding, the maximum value of each of the distances L5 and L6 is set to be equal to or smaller than ½ of the length L1 of the information display portion 22 in the longitudinal direction. The reason is that a configuration is adopted in view of visibility of the information display portion 22.

For example, when the distances L5 and L6 are too large, an advantageous effect of emphasizing the information display portion 22 decreases, and the visibility of the information display portion 22 decreases.

Therefore, the maximum values of the distances L5 and L6 is set to be equal to or smaller than ½ of the length L1 of the information display portion 22 in the longitudinal direction. In this manner, deterioration in the visibility of the information display portion 22 can be prevented.

Furthermore, in the above-described injection molding, the maximum value of the depth L4 of the background portion 23 is set to be equal to the depth L2 of the information display portion 22. The reason is that a configuration is adopted in view of visibility of the information display portion 22.

For example, when the depth L4 is too large, the information display portion 22 is disposed at a position recessed from a surface of the cartridge 20, and the visibility of the information display portion 22 deteriorates.

Therefore, the maximum value of the depth L4 of the background portion 23 is set to be equal to the depth L2 of the information display portion 22. In this manner, the visibility for a user can be improved by improving the visibility of the information display portion 22.

In the present exemplary embodiment, the recess portion 21 provided on the exterior surface 20*b* of the cartridge 20 includes an information display portion 22 indicating a character trademark and a background portion 23 serving as a background of the information display portion 22. In addition, the information display portion 22 has a recess shape recessed from the background portion 23. In this manner, displaying and hiding information such as a logo or a standard provided in the cartridge 20 can be switched with a simple configuration.

Meanwhile, when the information display portion 22 is provided in a projection shape projecting from the exterior surface 20*b* as in the related art, it is difficult to hide the information display portion 22 protruding from the exterior surface 20*b*. That is, when a shielding portion further protruding from the exterior surface 20*b* is provided to cover the information display portion 22 having the projection shape, an outer dimension of the cartridge varies between a case of OEM supply and a case of non-OEM supply. Therefore, there is a possibility that the cartridge may not be mountable on an apparatus body. In addition, when the information display portion 22 having the projection shape is cut, the information display portion 22 is visible as a cutting trace, and thus, it is difficult to hide the information display portion 22.

In this way, according to the present exemplary embodiment, the information display portion 22 is easily visible in a case of non-OEM supply, and the information display portion 22 is easily hidden by filling the background portion 23 in a case of OEM supply. In addition, even when a member for filling the background portion 23 is provided, it is also possible to suppress a difference in the outer dimension of the cartridge serving as the replacement unit between a case of OEM supply and a case of non-OEM supply. Furthermore, since the member for filling the background portion 23 is provided, the information display portion 22 is hidden with a simple configuration.

In the present exemplary embodiment, the information display portion 22 is recessed from the background portion 23. However, without being limited thereto, an information display portion 122 may be formed in a projection shape projecting from the background portion 23 by the injection molding as illustrated in FIG. 6.

Figure 4:
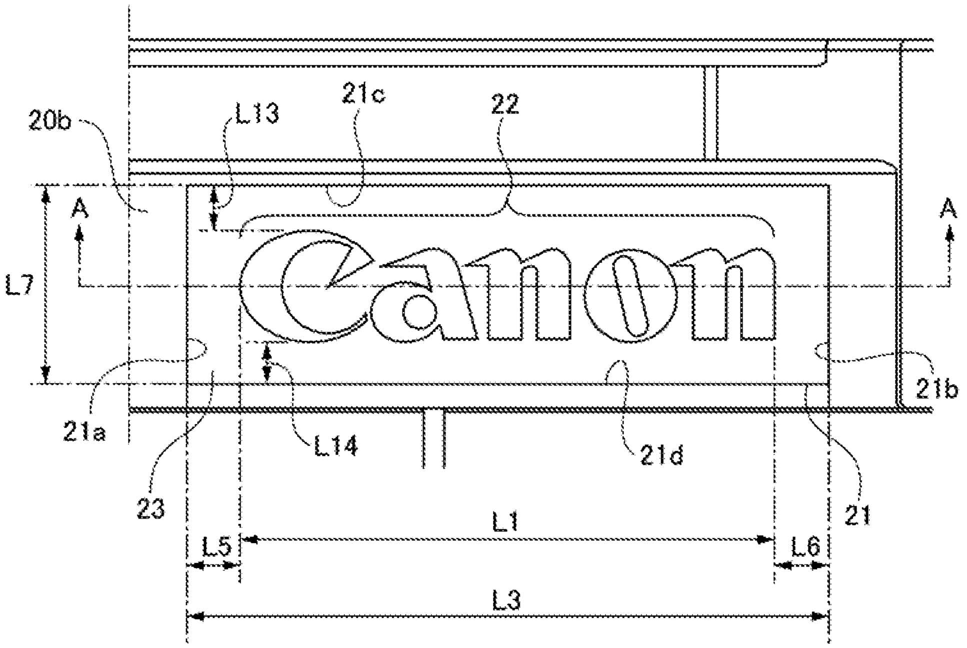
FIG. 4 is an enlarged view of a part of the cartridge according to the first embodiment of the present invention.
Figure 5:
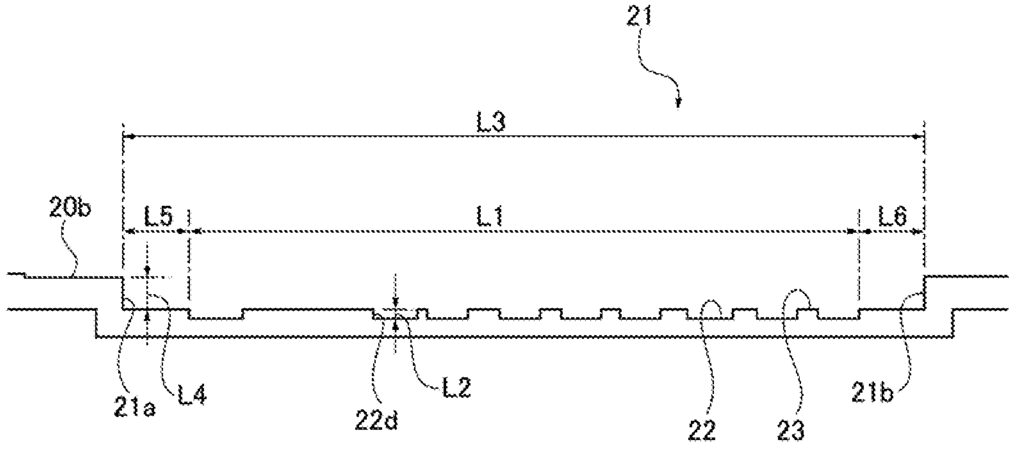
FIG. 5 is a cross-sectional view taken along line A-A in FIG. 4.
Figure 6:
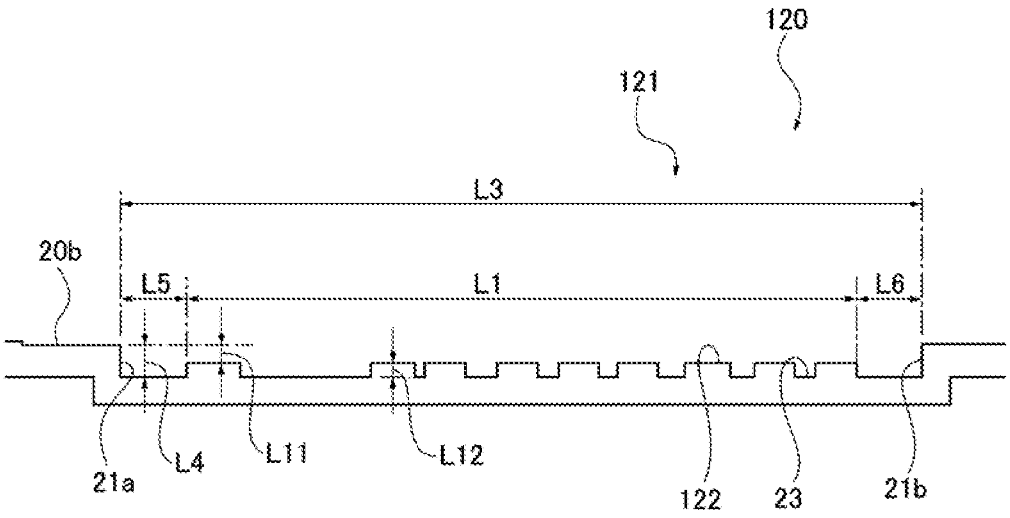
FIG. 6 is a cross-sectional view of a modification example of the cartridge according to the first embodiment of the present invention.

In FIG. 6, the same reference numerals will be assigned to portion having the same configurations as those in FIGS. 4 and 5, and description thereof will be omitted.

The cartridge 120 is a replacement unit mounted on the image forming portion 44 of the image forming apparatus 1 such as the developing cartridge or the drum cartridge. Without being limited to the cartridge mounted on the image forming portion 44 such as the developing cartridge or the drum cartridge, the cartridge 120 may be any cartridge mountable on the image forming apparatus 1.

The cartridge 120 includes a housing 20*a* and a recess portion 121.

The recess portion 121 is provided on the exterior surface 20*b* visible from the outside of the housing 20*a*, and has a recess shape recessed from the exterior surface 20*b* of the housing 20*a*. Specifically, the recess portion 121 includes the information display portion 122 and the background portion 23.

The information display portion 122 has a projection shape projecting from the background portion 23. The information display portion 122 displays information on the cartridge 120.

The background portion 23 serves as a background of the information display portion 122.

The minimum value of the distance L5 between the inner wall portion 21*a* on one end side of the recess portion 121 in the longitudinal direction and one end side of the information display portion 122 in the longitudinal direction is 1/10 of the length L1 of the information display portion 122 in the longitudinal direction. In addition, the minimum value of the distance L6 between the inner wall portion 21*b* on the other end side of the recess portion 121 in the longitudinal direction and the other end side of information display portion 122 in the longitudinal direction is 1/10 of the length L1 of the information display portion 122 in the longitudinal direction. That is, each of the distances L5 and L6 is equal to or larger than 1/10 of the length L1 of the information display portion 122 in the longitudinal direction. In addition, the maximum value of each of the distances L5 and L6 is ½ of the length L1 of the information display portion 122 in the longitudinal direction. That is, each of the distances L5 and L6 is equal to or smaller than ½ of the length L1 of the information display portion 122 in the longitudinal direction.

Here, a distance L4 from the exterior surface 20*b* to the background portion 23 is longer than a distance L11 from the exterior surface 20*b* to the information display portion 122. In addition, a height L12 from the background portion 23 of the information display portion 22 is smaller than the distance L4 from the exterior surface 20*b* to the background portion 23. In this way, since the information display portion 122 has a projection shape projecting from the background portion 23, the visibility is better than that of the information display portion 22.

In addition, since a member for hiding the information display portion 122 is provided in the recess portion 121 recessed from the exterior surface 20*b*, the information display portion 122 can be hidden with a simple configuration. In addition, it is possible to suppress a difference in the outer dimension of the cartridge 120 between a case of OEM supply and a case of non-OEM supply.

Furthermore, in the cartridge 120 illustrated in FIG. 6, the lengths L1 and L3 to L7 are set under the same condition as that of the cartridge 20 illustrated in FIG. 5. In this manner, the same advantageous effects as those of the cartridge 20 can be achieved.

Second Embodiment

Figure 2:
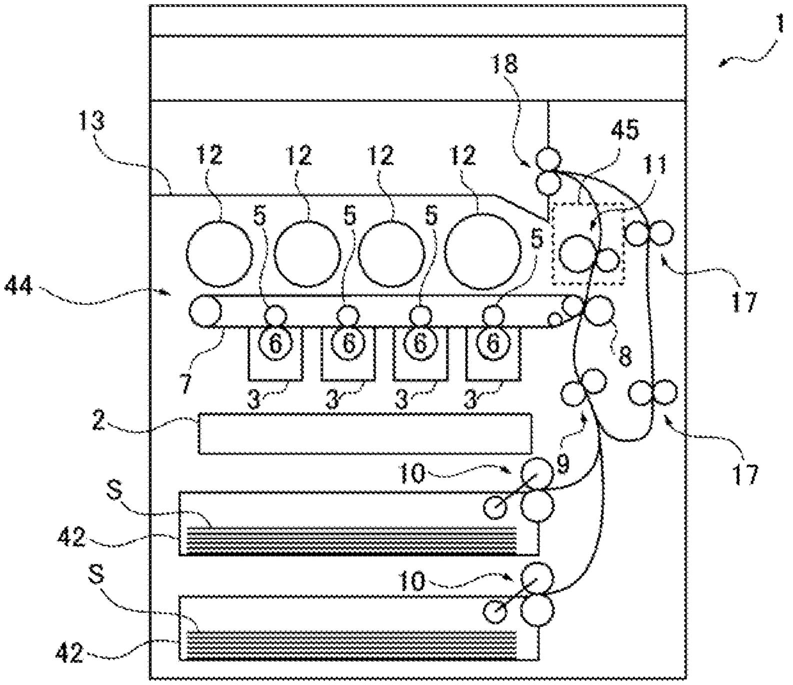
FIG. 2 is a schematic view of the image forming apparatus according to the first embodiment of the present invention.

A configuration of an image forming apparatus according to a second embodiment of the present invention is the same as the configuration in FIGS. 1 and 2, and thus, description thereof will be omitted. An operation of the image forming apparatus according to the present exemplary embodiment is the same as the operation of the image forming apparatus 1, and thus, description thereof will be omitted.

<Configuration of Cartridge>

A configuration of a cartridge 20 according to a second embodiment of the present invention will be described in detail with reference to FIGS. 7 to 9. The cartridge 20 according to the present embodiment uses a plate member 25 as a member for hiding an information display portion 22.

Figure 3:
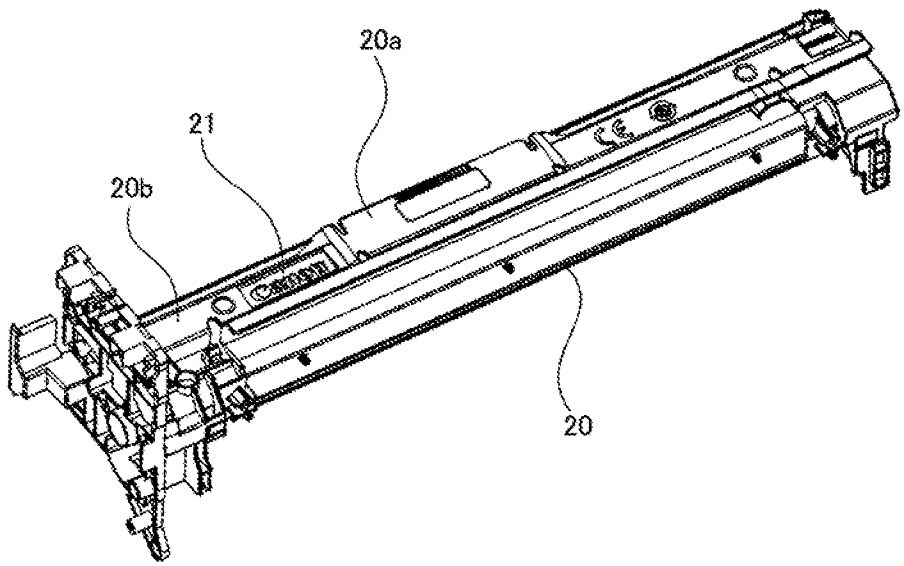
FIG. 3 is a perspective view of a cartridge according to the first embodiment of the present invention.
Figure 7:
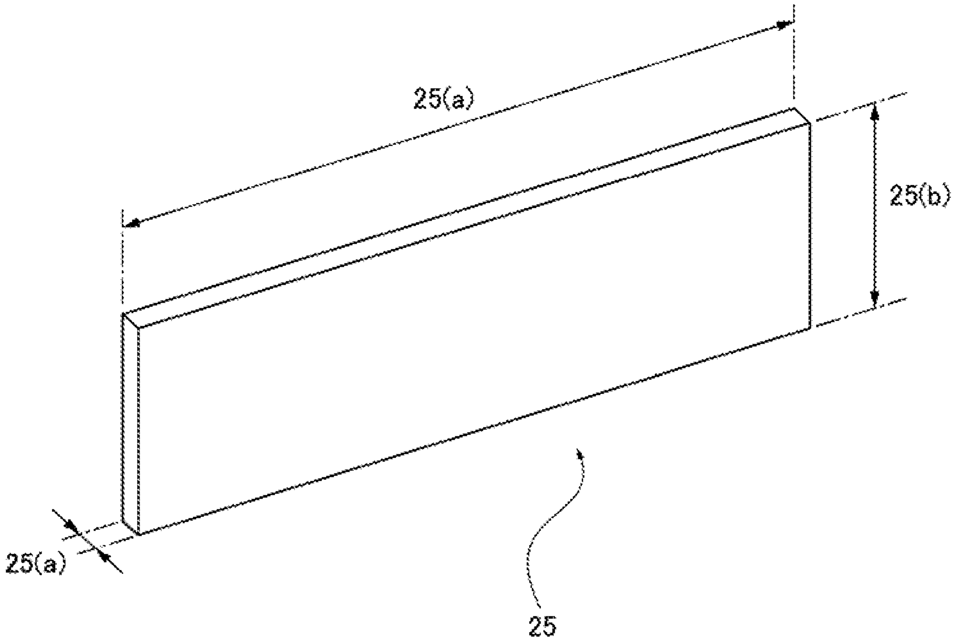
FIG. 7 is a perspective view of a plate member attached to a cartridge according to a second embodiment of the present invention.
Figure 8:
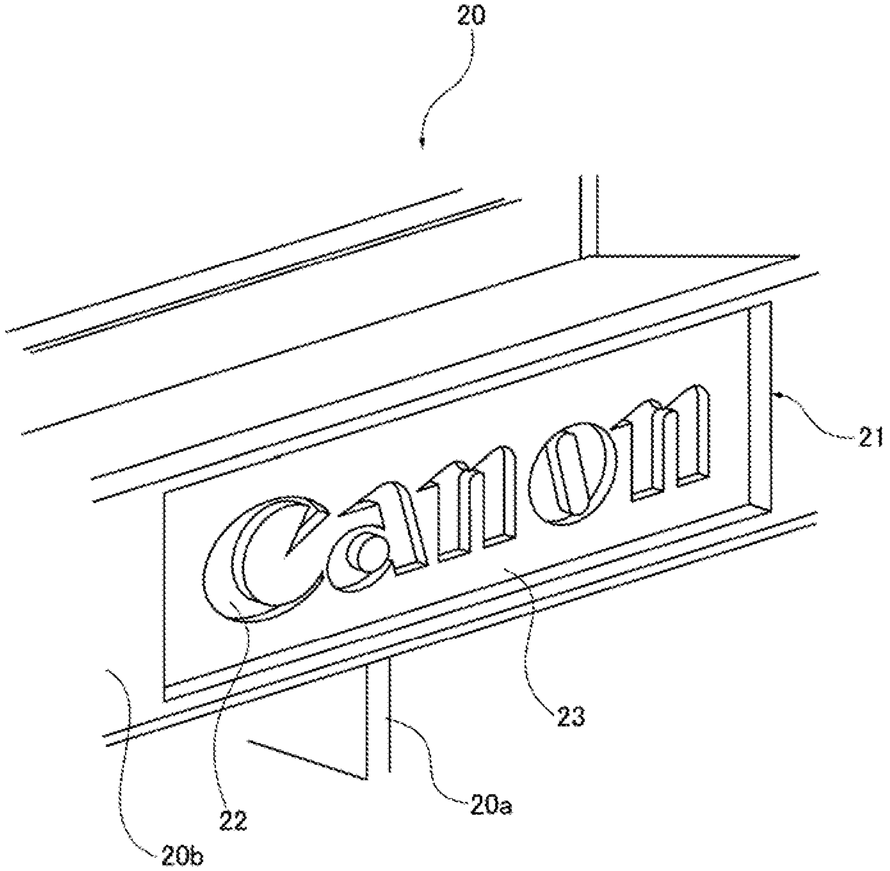
FIG. 8 is a perspective view illustrating a state before the plate member is attached to the cartridge according to the second embodiment of the present invention.
Figure 9:
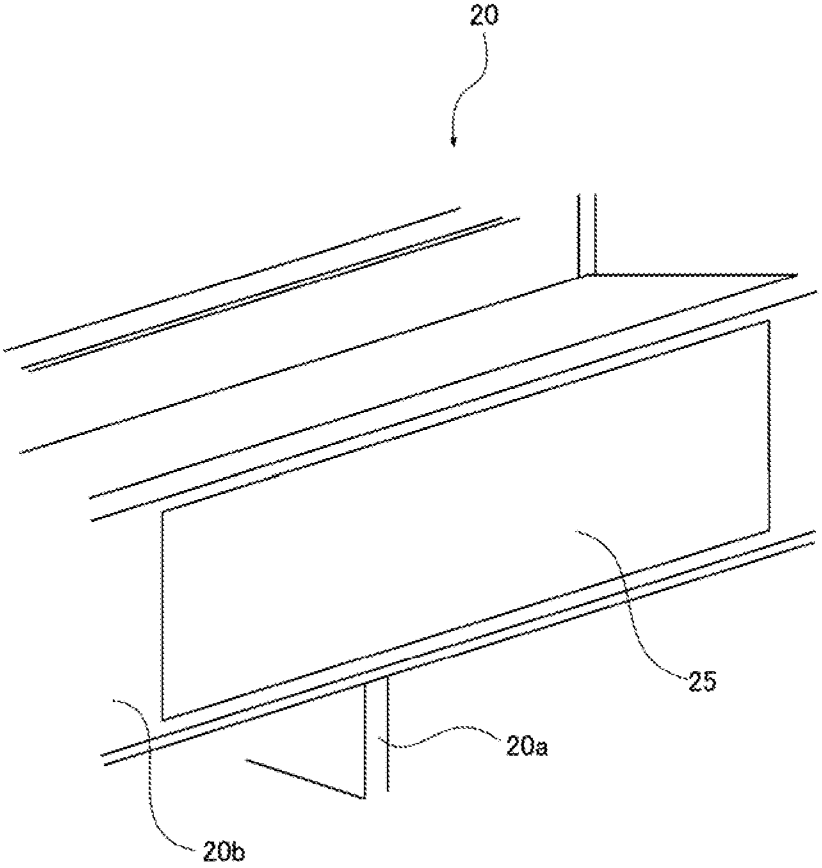
FIG. 9 is a perspective view illustrating a state after the plate member is attached to the cartridge according to the second embodiment of the present invention.

In FIGS. 7 to 9, the same reference numerals will be assigned to portions having the same configurations as those in FIGS. 3 to 5, and description thereof will be omitted.

The cartridge 20 is a component mounted on an image forming portion of the image forming apparatus such as the developing container or the drum unit. Without being limited to the component mounted on the image forming portion such as the developing container or the drum unit, the cartridge 20 may be any component mountable on the image forming apparatus.

The cartridge 20 includes a housing 20*a*, a recess portion 21, and a plate member 25.

The plate member 25 has a size and a shape which can be fitted into the recess portion 21, and is provided to hide display contents of the information display portion 22. A thickness L10 of the plate member 25 is smaller than a depth L4 of the recess portion 21. A length L8 of the plate member 25 in the longitudinal direction is equal to or smaller than a length L3 of the recess portion 21 in the longitudinal direction. A length L9 of the plate member 25 in a short direction is equal to or smaller than a length L7 of a background portion 23 in the short direction.

The plate member 25 is bonded to the background portion 23 with an adhesive or a pressure-sensitive adhesive (not illustrated). The plate member 25 is configured not to protrude from the background portion 23 when attached to the background portion 23, and is configured not to protrude from the exterior surface 20*b* of the cartridge 20.

<Method for Manufacturing Cartridge>

A method for manufacturing the cartridge 20 according to the second embodiment of the present invention will be described in detail with reference to FIGS. 7 to 9.

When the cartridges 20 are mounted on a plurality of the image forming apparatuses having different brands, in some cases, a configuration is adopted so that the information display portion 22 is not visible from the outside depending on the brand. For example, in a manufacturer of the cartridge 20, it is assumed that the cartridge 20 is diversely used between products adopting different sales strategies in order to reduce an investment amount or to improve development efficiency. In this case, since the brand names of the products may be different, the information display portion 22 cannot be used for the product of the diversely use destination. Therefore, in this case, it is necessary to hide the information display portion 22 by the plate member 25.

First, the information display portion 22 is in a visible state from the outside before the plate member 25 illustrated in FIG. 8 is mounted. In this state, the plate member 25 is attached to the background portion 23 by an adhesion. In this manner, the information display portion 22 is brought into an invisible state from the outside as illustrated in FIG. 9. In this manner, the cartridge 20 can be diversely used without preparing the cartridge for each product having the different brand name, and the investment amount can be suppressed, or the development efficiency can be improved.

In addition, since the recess portion 21 is provided and the thickness L10 of the plate member 25 is set to be smaller than the depth L4 of the recess portion 21, the plate member 25 can be prevented from protruding from the surface of the cartridge 20. In a case where the information display portion 22 is directly provided on the exterior surface 20*b* of the cartridge 20 without providing the recess portion 21, a member for hiding the information display portion 22 is brought into a state of protruding from the surface of the cartridge. In this state, there is a possibility that the member comes into contact with a component in the vicinity of the cartridge in order to hide the information display portion 22 when the cartridge is replaced, and the component in the vicinity is affected by damage.

In addition, since the information display portion 22 is recessed in the background portion 23, an area of an attachment surface of the plate member 25 in the background portion 23 can be increased, compared to a case where the information display portion having a projection shape is formed. In this manner, the plate member 25 can be attached to the background portion 23 in a stable state.

The surface visible from the outside of the plate member 25 may be a plain surface as illustrated in FIG. 9, or a manufacturer logo which is information on the cartridge 20 different from the information display portion 22 may be displayed. In this case, a logo of a different manufacturer can be written only by replacing the plate member 25. Therefore, costs can be reduced.

In addition, in the present exemplary embodiment, the thickness L10 of the plate member 25 is set to be smaller than the depth L4 of the background portion 23. However, without being limited thereto, the thickness of the plate member may be set to be slightly larger than the depth L4 of the recessed portion. In this manner, it is possible to minimize a possibility that the plate member may come into contact with component in the vicinity of the cartridge.

In addition, in the present exemplary embodiment, the information display portion 22 is recessed in background portion 23. However, without being limited thereto, the information display portion 122 having a projection shape may be formed in background portion 23 as illustrated in FIG. 6. In this case, the plate member 25 can be stably attached to an upper portion of the information display portion 22. In order to more stably attach the plate member 25, it is preferable that the information display portion 22 is recessed in the background portion 23.

When the information display portion 22 having the projection shape is formed in the background portion 23, the thickness L10 of the plate member 25 is smaller than the distance from the exterior surface 20*b* to the information display portion 22.

As a matter of course, the present invention is not limited to the above-described exemplary embodiments, and various modifications can be made within the scope not departing from the concept of the present invention.

Specifically, in the first embodiment and the second embodiment described above, the cartridge 20 or the cartridge 120 is mounted on the image forming apparatus. However, without being limited thereto, the cartridge 20 or the cartridge 120 may be mountable on an apparatus other than the image forming apparatus.

In the first embodiment and the second embodiment described above, a distance L13 between an inner wall portion 21*c* on one end side of the recess portion 21 in the short direction and the information display portion 22 may be set to be equal to or larger than 1/10 and equal to or smaller than 1/2 of the length L1. In addition, a distance L14 between an inner wall portion 21*d* on the other end side of the recess portion 21 in the short direction and the information display portion 22 may be set to be equal to or larger than 1/10 and equal to or smaller than ½ of the length L1. In this manner, it is possible to further prevent deterioration in the visibility of the information display portion 22 and the mass productivity of the cartridge 20.

In addition, in the first embodiment and the second embodiment described above, the recess portion 21 or the recess portion 121 is formed by performing the injection molding on the resin. However, without being limited thereto, the recess portion may be formed by pressing a sheet metal.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2022-041199, filed Mar. 16, 2022, which is hereby incorporated by reference herein in its entirety.

What is claimed is:

1. A cartridge mountable on an image forming apparatus, the cartridge comprising:
- a recess portion provided on an exterior surface of the cartridge, and including:
  - an inner surface disposed recessed relative to the exterior surface; and
  - a character portion indicating a character trademark recessed relative to the inner surface,
- wherein a distance between an inner wall portion on one end side or the other end side in a longitudinal direction of the recess portion and the one end side or the other end side in the longitudinal direction of the character portion is:
  - equal to or larger than 1/10 of a length in the longitudinal direction of the character portion; and
  - equal to or smaller than ½ of the length in the longitudinal direction of the character portion.

2. The cartridge according to claim 1, wherein a distance from the exterior surface to the inner surface is equal to or greater than a depth of the character portion.

3. The cartridge according to claim 1, wherein a depth of the character portion is equal to or smaller than 1/10 of the length in the longitudinal direction of the character portion.

4. A cartridge mountable on an image forming apparatus, the cartridge comprising:
- a recess portion provided on an exterior surface of the cartridge, and including:
  - a character portion indicating a character trademark; and
  - a background portion serving as a background of the character portion,
- wherein the character portion extends upwardly from the background portion toward the exterior surface,
- wherein a distance from the exterior surface to the background portion is longer than a distance from the exterior surface to the character portion, and
- wherein a distance between an inner wall portion on one end side or the other end side in a longitudinal direction of the recess portion and the one end side or the other end side in the longitudinal direction of the character portion is:
  - equal to or larger than 1/10 of a length in the longitudinal direction of the character portion; and
  - equal to or smaller than ½ of the length in the longitudinal direction of the character portion.

5. A cartridge mountable on an image forming apparatus, the cartridge comprising:
- a recess portion provided on an exterior surface of the cartridge, and including:
  - an inner surface disposed recessed relative to the exterior surface; and
  - an object portion indicating a logo trademark recessed relative to the inner surface,
- wherein a distance between an inner wall portion on one end side or the other end side in a longitudinal direction of the recess portion and the one end side or the other end side in the longitudinal direction of the object portion is:
  - equal to or larger than 1/10 of a length in the longitudinal direction of the object portion; and
  - equal to or smaller than ½ of the length in the longitudinal direction of the object portion.

6. The cartridge according to claim 5, wherein a distance from the exterior surface to the inner surface is equal to or greater than a depth of the object portion.

7. The cartridge according to claim 5, wherein a depth of the object portion is equal to or smaller than 1/10 of the length in the longitudinal direction of the object portion.

8. A cartridge mountable on an image forming apparatus, the cartridge comprising:
- a recess portion provided on an exterior surface of the cartridge, and including:
  - an object portion indicating a logo trademark; and
  - a background portion serving as a background of the object portion,
- wherein the object portion projects from the background portion,
- wherein a distance from the exterior surface to the background portion is longer than a distance from the exterior surface to the object portion, and
- wherein a distance between an inner wall portion on one end side or the other end side in a longitudinal direction of the recess portion and the one end side or the other end side in the longitudinal direction of the object portion is:
  - equal to or larger than 1/10 of a length in the longitudinal direction of the object portion; and
  - equal to or smaller than ½ of the length in the longitudinal direction of the object portion.

9. The cartridge according to claim 1, further comprising a plate member attached to the recess portion.

10. The cartridge according to claim 9, wherein a thickness of the plate member is equal to or smaller than a distance from the exterior surface to the inner surface.

11. The cartridge according to claim 4, further comprising a plate member attached to the recess portion.

12. The cartridge according to claim 11, wherein a thickness of the plate member is equal to or smaller than a distance from the exterior surface to the character portion.

13. The cartridge according to claim 8, further comprising a plate member attached to the recess portion.

14. The cartridge according to claim 13, wherein a thickness of the plate member is equal to or smaller than a distance from the exterior surface to the object portion.

15. The cartridge according to claim 1, wherein the cartridge is a developing cartridge including a developing unit that develops an electrostatic latent image formed on a photosensitive drum using a toner.

16. The cartridge according to claim 1, wherein the cartridge is a drum cartridge including a photosensitive drum.

17. An image forming apparatus comprising:
- the cartridge according to claim 1; and an image forming portion that forms an image on a sheet using the cartridge.

* * * * *